US012393563B2

(12) United States Patent
Lambert et al.

(10) Patent No.: US 12,393,563 B2
(45) Date of Patent: *Aug. 19, 2025

(54) STORAGE AND STRUCTURED SEARCH OF HISTORICAL SECURITY DATA

(71) Applicant: Google LLC, Mountain View, CA (US)

(72) Inventors: Collin Lambert, Mountain View, CA (US); Innokentiy Basmov, Mountain View, CA (US); Ethan Daniel Gaebel, Mountain View, CA (US); Andrew Liang Ping Chang, San Jose, CA (US); Iulia Ion, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,579

(22) Filed: Oct. 20, 2021

(65) Prior Publication Data

US 2022/0035783 A1 Feb. 3, 2022

Related U.S. Application Data

(63) Continuation of application No. 16/198,344, filed on Nov. 21, 2018, now Pat. No. 11,163,737.

(51) Int. Cl.
*G06F 7/00* (2006.01)
*G06F 16/22* (2019.01)
(Continued)

(52) U.S. Cl.
CPC .......... *G06F 16/2228* (2019.01); *G06F 16/27* (2019.01); *G06F 16/284* (2019.01);
(Continued)

(58) Field of Classification Search
CPC .... G06F 21/604; G06F 21/62; G06F 16/2477; G06F 16/1834; G06F 16/2228; G06F 16/27; G06F 16/284; G06F 16/951
See application file for complete search history.

(56) References Cited

U.S. PATENT DOCUMENTS 6,138,121 A 10/2000 Costa et al.
8,752,178 B2 6/2014 Coates et al.
(Continued)

FOREIGN PATENT DOCUMENTS

JP 2000-040063 A 2/2000
JP 2017-522664 A 8/2017
(Continued)

OTHER PUBLICATIONS

International Search report for the related application No. PCT/US2019/053073 dated Sep. 26, 2019.
(Continued)

*Primary Examiner* — Mohammed R Uddin
(74) *Attorney, Agent, or Firm* — Honigman LLP; Brett A. Krueger

(57) ABSTRACT

A method includes ingesting event data over a network for a plurality of events obtained by disparate computing resources. Each event is associated with a respective timestamp and one or more ingestion-attributes. The method includes identifying whether the corresponding event is associated with any custom indexing-attributes defined by a user. The method also includes indexing the corresponding event into a data store as structured data based on the respective timestamp, the one or more ingestion-attributes, and any identified custom indexing-attributes. The method includes evicting any of the events of the event data in the data store for a period of time that satisfies an eviction time period threshold. The method also includes retrieving the data from the data store that is associated with the time range, the ingestion-attributes, or the one custom indexing-attributes.

20 Claims, 7 Drawing Sheets

(51) Int. Cl.
  *G06F 16/27* (2019.01)
  *G06F 16/28* (2019.01)
  *G06F 16/951* (2019.01)
  *G06F 21/60* (2013.01)
  *G06F 21/62* (2013.01)

(52) U.S. Cl.
  CPC .......... *G06F 16/951* (2019.01); *G06F 21/604* (2013.01); *G06F 21/62* (2013.01)

(56) References Cited

U.S. PATENT DOCUMENTS

| | | |
|---|---|---|
| 10,409,817 B1 * | 9/2019 | Dias .................... G06F 16/2477 |
| 10,643,002 B1 | 5/2020 | Veselov et al. |
| 10,776,355 B1 | 9/2020 | Batsakis et al. |
| 2003/0200192 A1 * | 10/2003 | Bell .................... G06F 16/9537 |
| 2006/0075007 A1 | 4/2006 | Anderson et al. |
| 2006/0265746 A1 * | 11/2006 | Farley .................... G06F 21/577 726/13 |
| 2008/0208820 A1 * | 8/2008 | Usey .................... G06F 16/313 |
| 2010/0114895 A1 | 5/2010 | Bhagwan et al. |
| 2010/0185963 A1 | 7/2010 | Slik et al. |
| 2012/0136921 A1 | 5/2012 | Samdadiya et al. |
| 2015/0046251 A1 | 2/2015 | Smith |
| 2015/0134795 A1 | 5/2015 | Theimer et al. |
| 2015/0154249 A1 * | 6/2015 | Dave .................... G06F 16/951 707/758 |
| 2016/0063001 A1 | 3/2016 | Scriffignano et al. |
| 2016/0224600 A1 * | 8/2016 | Munk .................... G06Q 20/08 |
| 2016/0299957 A1 | 10/2016 | A. C. et al. |
| 2016/0306871 A1 | 10/2016 | Chauhan et al. |
| 2016/0335361 A1 | 11/2016 | Teodorescu et al. |
| 2017/0048261 A1 | 2/2017 | Gmach et al. |
| 2017/0063920 A1 | 3/2017 | Thomas et al. |
| 2017/0134243 A1 | 5/2017 | Levesque et al. |
| 2018/0004826 A1 | 1/2018 | Reiner et al. |
| 2018/0005274 A1 | 1/2018 | Calvillo et al. |
| 2018/0069925 A1 | 3/2018 | Lavasani |
| 2018/0089272 A1 | 3/2018 | Bath et al. |
| 2018/0173583 A1 | 6/2018 | Braundmeier et al. |
| 2018/0176244 A1 | 6/2018 | Gervais et al. |
| 2018/0246926 A1 * | 8/2018 | Altaf .................... G06F 16/215 |
| 2018/0276223 A1 * | 9/2018 | Dhanasekaran ...... G06F 16/125 |
| 2018/0276232 A1 * | 9/2018 | Dhanasekaran ........ G06F 16/25 |
| 2019/0018844 A1 | 1/2019 | Bhagwat et al. |
| 2019/0018904 A1 * | 1/2019 | Russell .................... G06F 16/27 |
| 2019/0073615 A1 | 3/2019 | Ronen et al. |
| 2019/0095478 A1 | 3/2019 | Tankersley et al. |
| 2019/0318019 A1 | 10/2019 | Abes et al. |

FOREIGN PATENT DOCUMENTS

| | | |
|---|---|---|
| JP | 2018-523862 A | 8/2018 |
| WO | 2015200051 A1 | 12/2015 |
| WO | 2017031302 A1 | 2/2017 |

OTHER PUBLICATIONS

Japanese Office Action for the related Application No. 2022-135855, dated Sep. 28, 2023, 4 pages.

* cited by examiner

STORAGE AND STRUCTURED SEARCH OF HISTORICAL SECURITY DATA

CROSS REFERENCE TO RELATED APPLICATIONS

This U.S. patent application is a continuation of, and claims priority under 35 U.S.C. § 120 from, U.S. patent application Ser. No. 16/198,344, filed on Nov. 21, 2018. The disclosure of this prior art application is considered part of the disclosure of this application and is hereby incorporated by reference in its entirety.

TECHNICAL FIELD

This disclosure relates to a system for storage and structured search of historical security data.

BACKGROUND

Identity, access, data, and resource security incidents continue to grow rapidly. Similarly, the amount of raw security signals available to be collected and analyzed is also growing exponentially. These security signals are a critical resource that enterprises need to protect themselves from security breaches and downtime. This need is driving human analysts and security engineers to increase efficiency and prioritization when dealing with this resource.

SUMMARY

One aspect of the disclosure provides a method including ingesting, by data processing hardware, event data over a network for a plurality of events obtained by a plurality of disparate computing resources in communication with the data processing hardware. The event data includes a respective timestamp for each event of the event data that indicates a point in time when the event was obtained by one of the plurality of disparate computing resources. The event data also includes at least one ingestion-attribute associated with each event of the event data, the at least one ingestion-attribute satisfying ingestion criteria required to permit ingesting of the associated event. For each of the plurality of events of the event data, the method includes identifying, by the data processing hardware, whether the corresponding event is associated with any custom indexing-attributes defined by a user for indexing events. The method also includes indexing, by the data processing hardware, the corresponding event into a data store as structured data based on the respective timestamp for the corresponding event, the at least one ingestion-attribute associated with the corresponding event, and any identified custom indexing-attributes associated with the corresponding event. The method also includes evicting, by the data processing hardware, any of the events of the event data that have been indexed into the data store as structured data for a period of time that satisfies an eviction time period threshold. The method also includes receiving, at the data processing hardware, a retrieval request for structured data stored in the data store, the retrieval request requesting structured data associated with at least one of a time range specified by the retrieval request, one or more ingestion-attributes specified by the retrieval request, or one or more custom indexing-attributes specified by the retrieval request. The method also includes retrieving, by the data processing hardware, the structured data from the data store that is associated with the at least one of the time range specified by the retrieval request, the one or more ingestion-attributes specified by the retrieval request, or the one or more custom indexing-attributes specified by the retrieval request.

Implementations of the disclosure may include one or more of the following optional features. In some examples, the custom indexing-attributes defined by the user for indexing events each include a respective key-value pair defined by a customer of the plurality of disparate computing resources. In some examples, the method includes, for each of the plurality of events of the event data, applying, by the data processing hardware, a set of validity rules to determine whether the corresponding event is valid. When the corresponding event is valid based on the applied set of validity rules, the method includes indexing the corresponding event into the data store as structured data. When the corresponding event is invalid based on the applied set of validity rules, the method includes rejecting, by the data processing hardware, the corresponding event for indexing into the data store. The set of validity rules may include a set of priority rules to determine a priority of the corresponding event. In some implementations, when receiving the retrieval request, the method includes receiving a structured data retrieval offset, the structured data retrieval offset indicating a position in a list of structured data to be retrieved, and where only structured data after the position in the list of structured data is retrieved. The method may further including sending, by the data processing hardware, a portion of the retrieved structured data and a page token and the page token indicating a position in a list of the retrieved structured data. The portion of the retrieved structured data includes only data from earlier positions than the page token in the list. In some examples, the data store includes a distributed storage system. In other examples, the data store includes a relational database. At least one of the plurality of events of the event data may be indicative of a measured characteristic of a corresponding one of the plurality of disparate computing resources. A priority of the measured characteristic may be determined based on a set of priority rules. Optionally, the retrieval request requesting structured data is associated with a first time range and a second time range and the second time range different from the first time range. In some implementations, ingesting the event data includes obtaining the event data over the network from the plurality of disparate computing resources via an application programming interface. The method may further include receiving, at the data processing hardware, an eviction request for evicting data, and the eviction request for evicting data may be associated with at least one of a time range specified by the eviction request, one or more ingestion-attributes specified by the eviction request, or one or more custom indexing-attributes specified by the eviction request. The method may also include evicting, by the data processing hardware, the structured data from the data store that is associated with the at least one of a time range specified by the eviction request, one or more ingestion-attributes specified by the eviction request, or one or more custom indexing-attributes specified by the eviction request. In some implementations, ingesting the event data is in response to at least one of: receiving an ingestion request, an indication from a time schedule, or an indication from an event. Retrieving the structured data may include verifying permissions of the structured data associated with the retrieval request.

Another aspect of the disclosure provides a system including data processing hardware and memory hardware in communication with the data processing hardware. The memory hardware stores instruction that when executed on the data processing hardware cause the data processing hardware to perform operations. The operations include ingesting event data over a network for a plurality of events obtained by a plurality of disparate computing resources in communication with the data processing hardware. The event data includes a respective timestamp for each event of the event data that indicates a point in time when the event was obtained by one of the plurality of disparate computing resources. The event data also includes at least one ingestion-attribute associated with each event of the event data and the at least one ingestion-attribute satisfies ingestion criteria required to permit ingesting of the associated event. For each of the plurality of events of the event data, the operations include identifying whether the corresponding event is associated with any custom indexing-attributes defined by a user for indexing events. The operations also include indexing the corresponding event into a data store as structured data based on the respective timestamp for the corresponding event. The at least one ingestion-attribute is associated with the corresponding event and any identified custom indexing-attributes are also associated with the corresponding event. The operations also include evicting any of the events of the event data that have been indexed into the data store as structured data for a period of time that satisfies an eviction time period threshold. The operations also include receiving a retrieval request for structured data stored in the data store. The retrieval request requests structured data associated with at least one of a time range specified by the retrieval request, one or more ingestion-attributes specified by the retrieval request, or one or more custom indexing-attributes specified by the retrieval request. The operations also include retrieving the structured data from the data store that is associated with the at least one of the time range specified by the retrieval request, the one or more ingestion-attributes specified by the retrieval request, or the one or more custom indexing-attributes specified by the retrieval request.

Implementations of the disclosure may include one or more of the following optional features. In some examples, the custom indexing-attributes defined by the user for indexing events each include a respective key-value pair defined by a customer of the plurality of disparate computing resources. The operations may further include, for each of the plurality of events of the event data, applying a set of validity rules to determine whether the corresponding event is valid. The operations may then also include that, when the corresponding event is valid based on the applied set of validity rules, indexing the corresponding event into the data store as structured data. The set of validity rules may include a set of priority rules to determine a priority of the corresponding event In some implementations, the operations further include, when the corresponding event is invalid based on the applied set of validity rules, rejecting the corresponding event for indexing into the data store. The retrieval request may include receiving a structured data retrieval offset, and the structured data retrieval offset may indicate a position in a list of structured data to be retrieved. Only structured data after the position in the list of structured data may be retrieved. The operations, in some examples, further include sending a portion of the retrieved structured data. The operations then include sending a page token, and the page token indicates a position in a list of the retrieved structured data. The operations may also include where the portion of the retrieved structured data includes only data from earlier positions than the page token in the list. In some examples, the data store includes a distributed storage system. In other examples, the data store includes a relational database. The at least one of the plurality of events of the event data may be indicative of a measured characteristic of a corresponding one of the plurality of disparate computing resources. The operations may include determining a priority of the measured characteristic based on a set of priority rules. The retrieval request requesting structured data, in some implementations, is associated with a first time range and a second time range, and the second time range different from the first time range. Ingesting the event data may include obtaining the event data over the network from the plurality of disparate computing resources via an application programming interface. In some implementations, the operations further include receiving an eviction request for evicting data, and the eviction request for evicting data is associated with at least one of a time range specified by the eviction request, one or more ingestion-attributes specified by the eviction request, or one or more custom indexing-attributes specified by the eviction request. The operations then include evicting the structured data from the data store that is associated with the at least one of a time range specified by the eviction request, one or more ingestion-attributes specified by the eviction request, or one or more custom indexing-attributes specified by the eviction request. In some implementations, ingesting the event data is in response to at least one of: receiving an ingestion request, an indication from a time schedule, or an indication from an event. Retrieving the structured data may include verifying permissions of the structured data associated with the retrieval request.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As the amount of available raw security signals that must be collected and analyzed grows exponentially (e.g., security findings or events for resources across a vast distributed computing system), enterprises are searching for ways to increase efficiency in detecting and responding to security issues in a cloud environment.

Implementations herein are directed toward systems and methods for enabling the indexing and joining of current and historic raw security data at-scale across previously disparate sources in-order to accelerate both programmatic and human analysis and their prioritization of the data to deliver insights and drive human understanding and prioritized response actions. In addition, implementations herein enable users to organize, manage, investigate, make informed decisions, and act based on abstractions of the user's assets, workloads and relevant threats, while further reducing the user's cognitive and effort load. These contributions reduce the time to detect and fix issues and minimizes the risks and blast radius of incidents by providing efficient ingestion and retrieval of structured time-stamped information about cloud resources and the security information associated with the cloud resources.

Figure 1A:
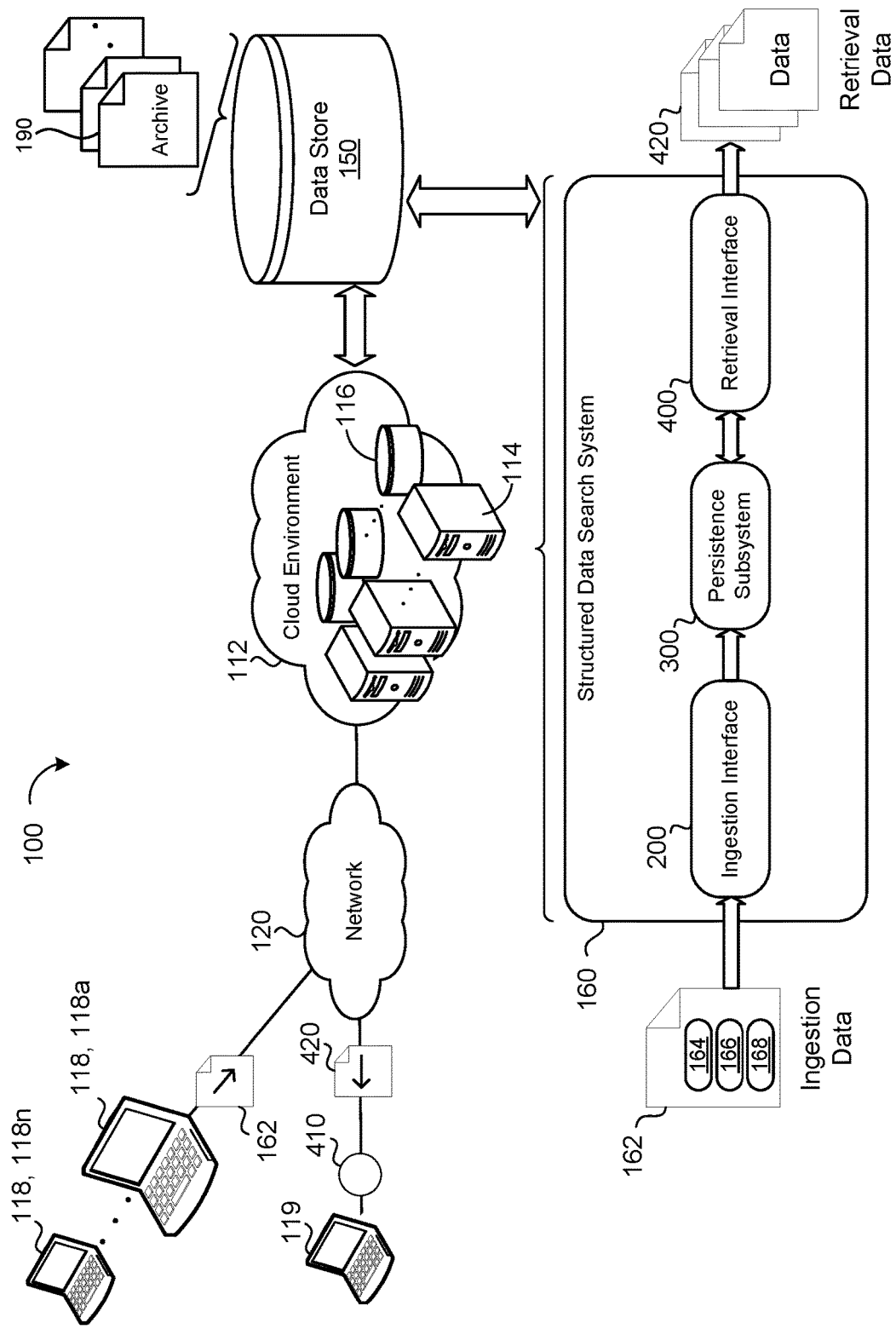
FIGS. 1A and 1B are schematic views of an example system for storing and searching structured event data.
Figure 1B:
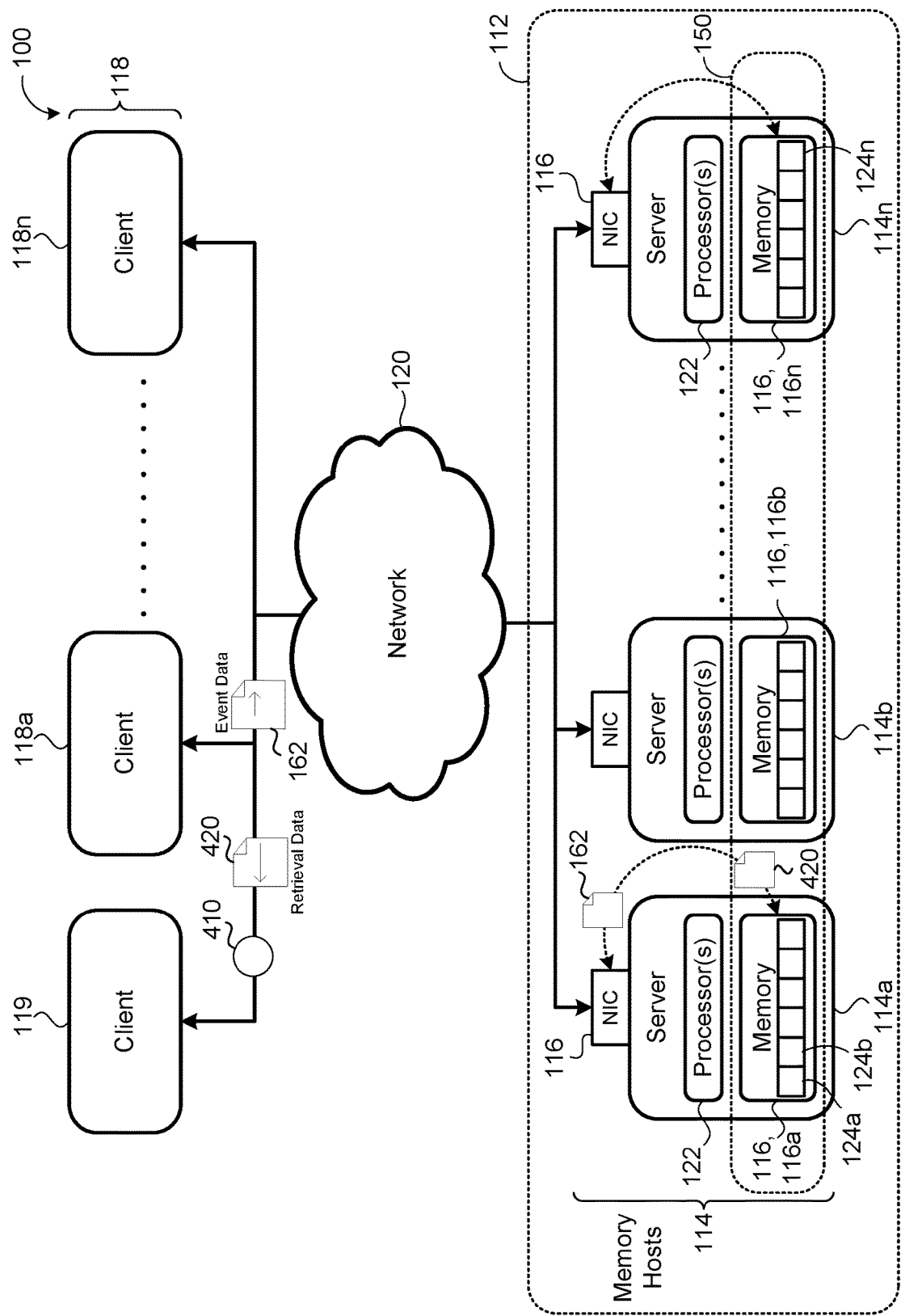

Referring to FIGS. 1A and 1B, in some implementations, an example system 100 includes a remote system 112. The remote system 112 may be a single computer, multiple computers, or a distributed system (e.g., a cloud environment) having scalable/elastic computing resources 114 (e.g., data processing hardware 610 (FIG. 6)) and/or storage resources 116 (e.g., memory hardware 620 (FIG. 6)). The remote system 112 is connected to a plurality of disparate computing resources or clients 118, 118a-n through network 120. A storage abstraction 150 (e.g., a distributed storage system or a data store) is overlain on the storage resources 116 to allow scalable use of the storage resources 116 by one or more of the client or computing resources 118. The remote system 112 executes a structured data search system 160. The search system 160 obtains and ingests event data 162 from the computing resources 118. The event data 162 represents events associated with cloud resources. In some implementations, the event data 162 or associated event is indicative of a measured characteristic of a corresponding one of the plurality of disparate computing resources 118. The event data 162, for example, includes characteristics associated with cloud resources, security and privacy vulnerabilities, and caller-provided annotation data. In some implementations, the event data 162 forms a hierarchy with a parent-child relationship (e.g., a hierarchy of cloud resources). The system 160 may determine a priority of the measured characteristic based on a set of priority rules. The event data 162 may also form a graph with a one-to-many or many-to-many relationships between elements. For example, the event data 162 may represent a cloud resource and all security issues associated with the cloud resource.

The event data 162 received by the search system 160 further includes a timestamp 164, at least one ingestion-attribute 166, and custom indexing-attributes 168. The custom indexing-attributes 168 may or may not be included in the event data 162. In some examples, the search system 160 includes an ingestion interface 200, a persistence subsystem 300, and a retrieval interface 400. The ingestion interface 200 receives the event data 162, processes the data 162, and passes the ingested data 162 to the persistence subsystem 300. The persistence subsystem 300 stores the event data 162 in the storage abstraction 150 as structured data. The storage abstraction 150 is configured to store the event data 162 from the computing resources 118. The distributed storage system 150 may implement an archive 190 (e.g., tape archive) configured to back-up stored event data 162 for recovery purposes. The archive 190 may include a long retention period (e.g., three (3) years). The retrieval interface 400, in response to a retrieval request 410 from a data requester 119, delivers retrieval data 420 to the data requester 119. The data requester 119 may be associated with a user/customer or entity that owns the event data 162 and corresponding retrieval data 420, and therefore may access the retrieval data 420 to inspect the contents thereof by transmitting the retrieval request 410 specifying the contents to include in the retrieval data 420.

Referring to FIG. 1B, in some implementations, the distributed system 140 includes loosely coupled memory hosts 114, 114a-n (i.e., data processing hardware)), each having a computing resource 122 (e.g., one or more processors or central processing units (CPUs)) in communication with storage resources 116 (e.g., memory hardware, flash memory, dynamic random access memory (DRAM), phase change memory (PCM), and/or disks) that may be used for caching data. The storage abstraction 150 overlain on the storage resources 116 allows scalable use of the storage resources 116 by one or more clients 118, 119. The clients 118, 119 may communicate with the memory hosts 114 through the network 120 (e.g., via remote procedure calls (RPC)). In some implementations, the remote distributed system 112 is "single-sided." "Single-sided" refers to the method by which most of the request processing on the memory hosts 114 may be done in hardware rather than by software executed on CPUs 122 of the memory hosts 114.

The distributed system 112 may store event data 162 obtained from clients 118, 119 into the storage resources 116 (e.g., storage abstraction 150) of the remote memory hosts 114 and get the retrieval data 420 from the remote memory hosts 114 via network interface controllers (NIC) 126. A network interface controller 126 (also known as a network interface card, network adapter, or LAN adapter) may be a computer hardware component that connects a computing device/resource 122 to the network 120. Both the memory hosts 114a-n and the clients 118, 119 may each have a network interface controller 126 for network communications. Each memory location 124 is configured to store event data 162. As used herein, the clients 118, 119 may include the disparate computing resources 118 that collect/obtain/measure the event data 162 ingested by the structured data system 160, and the data requesters 119 associated with customers/users associated with the event data 162 ingested by the structured data system 160 and corresponding retrieval data 410 retrieved from the structured data system 160 in response to sending retrieval requests 410.

Figure 2:
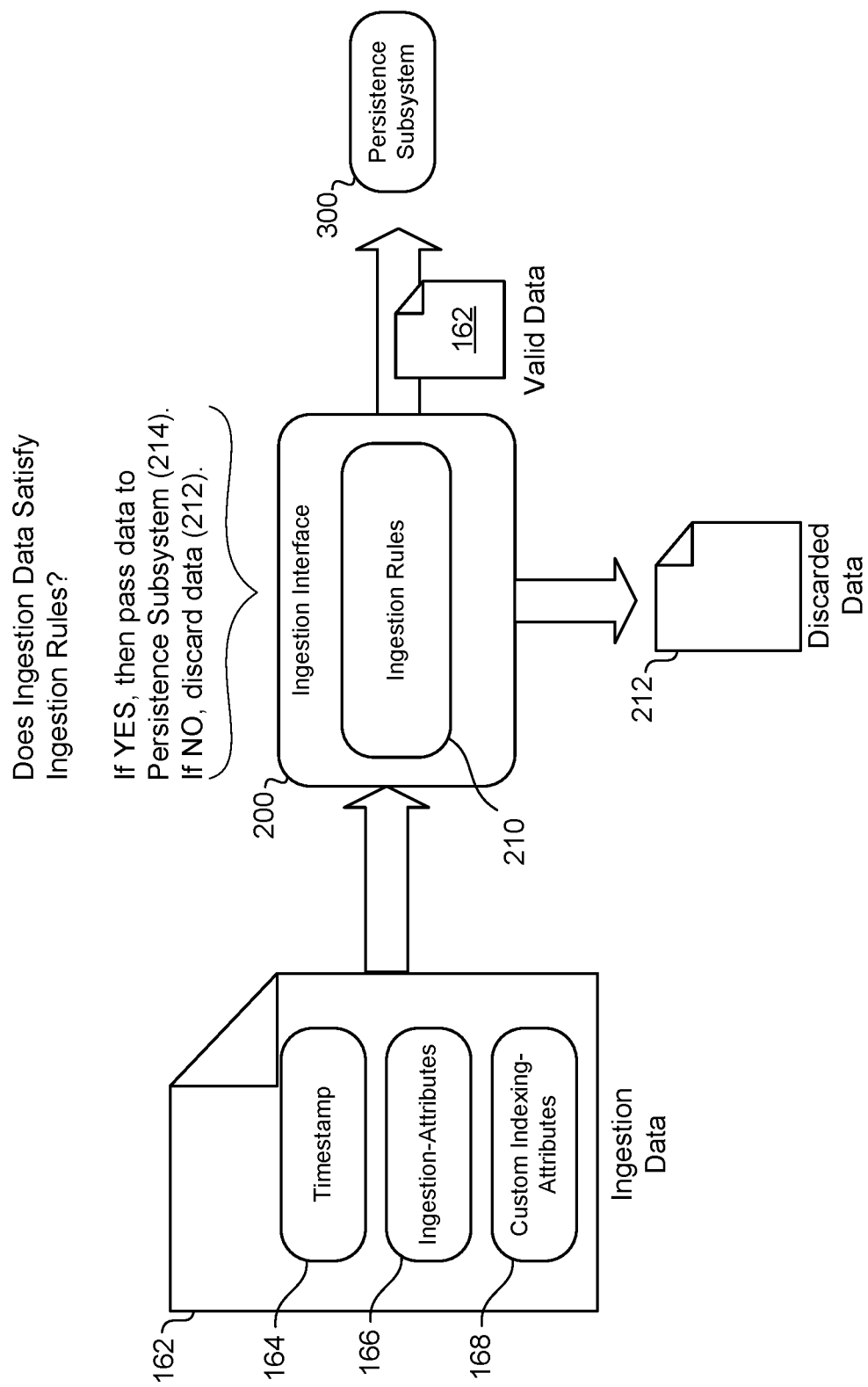
FIG. 2 is a schematic view of example components of an ingestion interface of the system of FIGS. 1A and 1B.

Referring now to FIG. 2, the ingestion interface 200 ingests the event data 162. The ingestion interface 200 may ingest the event data 162 by receiving the event data 162 from the disparate computing resources 118 and/or by actively fetching the event data 162 over the network 120 (e.g., via an application programming interface (API)) from the disparate computing resources. Optionally, the event data 162 may be written or updated via the API. That is, clients 118, 119 may push the event data 162 to the ingestion interface 200 via the API. The ingestion interface 200 may ingest data in response to any number of stimuli. For example, ingesting the event data may be in response to receiving an ingestion request. That is, a user or client requests the ingestion interface 200 to ingest data. The ingestion interface 200 may also ingest data in response to an indication from a time schedule. For example, a time schedule for the ingestion interface may specify specific times or ranges of times that event data should be ingested. Optionally, the ingestion interface 200 may ingest data in response to an indication from an event. That is, ingesting specific event data may trigger the ingestion of additional event data 162 from the same or different client 118.

As previously discussed, the event data 162 includes the timestamp 164. The timestamp 164 indicates a point in time when the respective computing resource 118 obtained the respective event. In some examples, the event is associated with a cloud resource and may include a characteristic or some other measurable parameter associated with operation of the cloud resource. For example, the event data 162 may include results from a security scanner that has scanned a remote computing resource 118. In another example, the event data 162 includes a notification that a password has been set on a computing resource 118 associated with a remote database. The timestamp 164 may indicate a time when the event occurred. That is, referring back to the scanner example, the timestamp 164 may indicate when the security scanner completed the scan or the remote computing resource 118 received the scanning results from the scanner. In some implementations, the timestamp 164 may indicate a time when the event data 162 was ingested by the structured data search system 160. In other implementations, the ingestion interface 200 provides a timestamp 164 (e.g., of the current time) when ingesting event data 162 that lacks a timestamp 164.

The event data 162 also includes one or more ingestion-attributes 166. These attributes 166 are required for the ingestion interface 200 to permit ingesting of the data 162. For example, the event data 162 may be compared against ingestion rules 210 (i.e., validity rules or ingestion criteria). If the rules 210 are not satisfied (e.g., missing an ingestion-attribute 166), the data 162 may be determined invalid, and the data 162 may be discarded 212 (i.e., ignored or rejected) or otherwise not ingested. If the rules 210 are satisfied (e.g., all ingestion-attributes 166 are present and in proper format), the ingestion interface 200 may determine that the data 162 is valid ingest the data 162 and proceed in sending the ingested data 162 to the persistence subsystem 300 for indexing. In some implementations, the ingestion rules 210 verify more than just the presence of the ingestion-attributes 166. For example, the ingestion rules 210 may enforce time and/or bandwidth constraints (e.g., an amount of data 162 or the rate at which the data 162 is obtained). In another example, the ingestion rules 210 enforce access control (i.e., permissions) to the data 162 and/or system 100 (i.e., verify that the data 162 has access or permission to the system 100 and/or that the system 100 has access or permission to the data 162). In yet another example, the ingestion rules 210 enforce ordering and may reject out-of-order updates. The ingestion rules may include a set of priority rules that determine a priority of the corresponding event. The data may be ingested or indexed based in part on the determined priority. The ingestion-attributes 166 may be strongly typed (i.e., the type and format of the attributes may be strictly enforced). The ingestion-attributes 166 may be represented as pairs (e.g., key, value).

With continued reference to FIG. 2, the event data 162, in some implementations, includes custom indexing-attributes 168. The custom indexing-attributes 168 are not essential for the ingestion interface 200 to ingest the data 162, but instead allow clients (e.g., data requesters 119) further flexibility and customization when indexing and retrieving the event data 162. That is, the event data 162 may be ingested regardless of the presence of custom indexing-attributes 168. For example, a description attribute defined by the client may be optional and the ingestion interface 200 may still ingest event data 162 lacking the description. Like the ingestion-attributes 166, the custom indexing-attributes 168 may be represented as (key, value) pairs that the customer or client define. In some implementations, the custom indexing-attributes 168 augment the event data 162 with additional caller-provided tuples (e.g., key, value, validity period).

Figure 3:
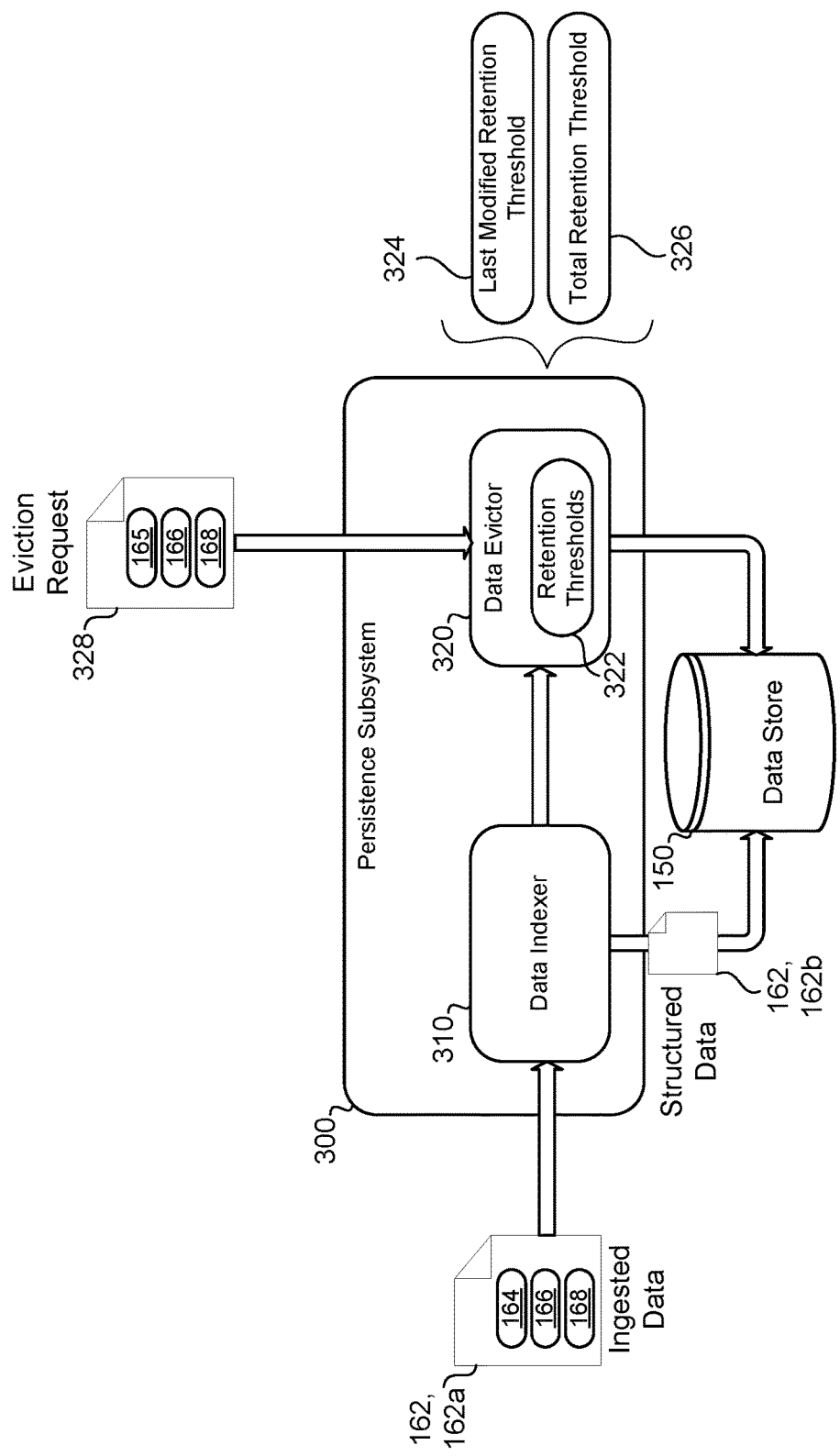
FIG. 3 is a schematic view of example components of a persistence subsystem of the system of FIGS. 1A and 1B.

Referring now to FIG. 3, the ingested data 162 (still including timestamp 164, at least one ingestion-attribute 166, and any custom indexing-attributes 168) is received by the persistence subsystem 300 as pre-indexed data 162*a*. In some implementations, the persistence subsystem includes a data indexer 310. The data indexer 310 accepts the pre-indexed data 162*a* and identifies whether the pre-indexed data 162*a* is associated with any custom-indexing-attributes 168 defined by the client 119 (or a user of the client). The data indexer 310 then indexes (i.e., structures) the ingested data 162 as structured data 162*b* into the data store (e.g., storage abstraction) 150 based on the respective timestamp 164, the ingestion-attributes 166, and any custom indexing-attributes 168. That is, the data indexer 310 orders and organizes the data 162 for efficient updating and retrieval in persistent storage. In some implementations, the data store 150 is associated with a relational database and the data indexer 310 indexes the data 162 into the relational database. Additionally or alternatively, the data store 150 may be associated with a distributed database and the data indexer 310 indexes the data 162*b* into the distributed database.

In some implementations, the data indexer 310, when structuring the data 162 (e.g., pre-indexed data 162*a*), adds the custom indexing-attributes 168. For example, the data indexer 310 may add a timeline attribute that includes all changes in the respective data's 162 attributes, properties, augmentations, and relationship structure (e.g., parent-child relationship), etc. over a specified period of time.

In some examples, the persistence subsystem 300 includes a data evictor 320. The data evictor 320 may include retention thresholds 322. The persistence subsystem 300, through the data evictor 320, may limit the amount of time during which structured data 162*b* is stored in the data store 150. That is, structured data 162*b* may have a respective retention threshold or eviction time period thresholds 322 (e.g., three months) and when an amount of time the data 162*b* has been stored in data store 150 satisfies this threshold 322, the data 162*b* may be evicted (i.e., deleted) from the data store 150. Different elements of the data 162 may have different retention thresholds 322. The threshold that is applied to an element of structured data 162*b* may be dependent upon one or more of: the respective timestamp 164, the ingestion-attributes 166, and any custom indexing-attributes 168. For example, an ingestion-attribute 166 may include an owner of the structured data 162*b* (i.e., the owner of the cloud resource associated with the event of the structured data 162*b*). The retention threshold 322 may be assigned to structured data 162*b* based on the status of the owner ingestion-attribute 166.

In some implementations, structured data 162*b* has more than one respective retention threshold 322. For example, structured data 162*b* may be associated with a last modified retention threshold 324 and a total retention threshold 326. Structured data 162*b* may, at times, be an update to previously received ingested data 162. For instance, structured data 162*b* may update the status (e.g., availability) of a cloud resource. The subsystem 300 may store older "versions" of the structured data 162*b* for less time than the total retention threshold 326 (i.e., less time than the "latest" version). For example, the last modified retention threshold 324 may be three months while the total retention threshold 326 may be thirteen months. When structured data 162*b* is updated, the older version of the data 162 (i.e., the data before it was updated) may be maintained for the last modified retention threshold 324 (three months) while the latest update 162*b* may be maintained for the total retention threshold 326 (thirteen months) unless later updated again.

With continued reference to FIG. 3, in some implementations, the persistence subsystem 300 receives an eviction request 328 from a user or client of the structured data search system 160. For instance, the user or client sending the eviction request 328 may be the same user or client associated with the data requester 119. The eviction request 328 requests to evict structured data 162b from the data store 150 that is associated with at least one of: a time range 165 specified by the eviction request 328, one or more ingestion-attributes 166 specified by the eviction request 328, or one or more custom indexing-attributes 168 specified by the eviction request 328. The data evictor 320 may evict any amount of structured data 162b based on the eviction request 328. For example, a user or client 119 may request eviction of all data associated with the respective client 119 as specified by a corresponding ingestion-attribute 166. In another example, a client 119 may request eviction of all data having timestamps 164 that fall within the time range 165 specified by the eviction request 328. The data evictor 320 may require verification (e.g., a username and password) that the requester 119 is authorized to evict the requested data 162.

Figure 4:
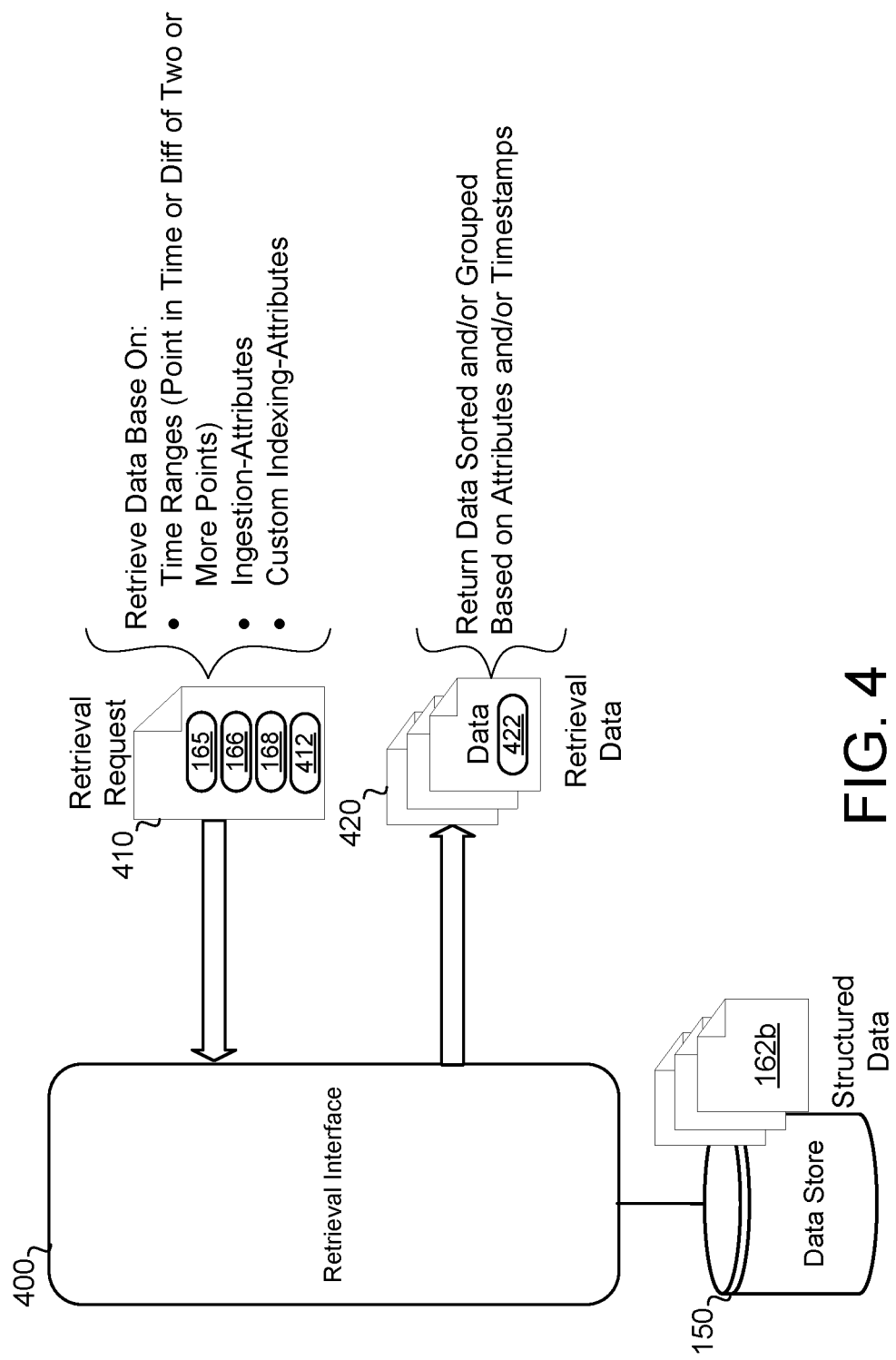
FIG. 4 is a schematic view of example components of a retrieval interface of the systems of FIGS. 1A and 1B.

Referring now to FIG. 4, the retrieval interface 400 (i.e., a query interface) receives a retrieval request 410 for structured data 162b stored in the data store 150. The retrieval request 410 may be substantially similar to the eviction request 328 of FIG. 3 except that the retrieval request 410 is requesting retrieval of the structured data 162b as retrieval data 420 from the data store 150. Thus, the retrieval request 410 may request structured data 162b from the data store 150 that is associated with at least one of: the time range 165 specified by the retrieval request 410, one or more ingestion-attributes 166 specified by the retrieval request 410, or one or more custom indexing-attributes 168 specified by the retrieval request 410. The custom indexing-attributes 168 specified by the retrieval request 410 may include attributes generated by the data indexer 310 (e.g., the timeline attribute). In some examples, the retrieval request 410 includes a request retrieve data from a specific point in time or to compare data 162b between a first time range and a second time range (also known as a "diff"), where each time range is different. The diff may be between more than two time ranges. The comparison may produce additional attributes. For example, the comparison may produce an attribute indicating whether data 162b existed at or both points in time or whether any of the data's 162b attributes, properties, or augmentations have changed between two points in time. In another example, the retrieval request 410 may request all data 162b associated with a specific cloud resource 118. The retrieval interface 400 will fetch the requested structured data 162b from the data store 150 and return the data 162b as retrieval data 420 to the requester 119. In some implementations, the retrieval interface 400 sorts and/or groups the retrieval data 420 based on attributes 166, 168 and/or timestamps 164.

The retrieval interface 400 may also filter, sort, or group the retrieval data 420 on any elements of the data 420, such as augmentations and relationship structure (e.g., parent-child relationship). The filtering may be specified in a standardized or proprietary query language. The retrieval interface may further group the retrieval data 420 with an aggregation function. For example, the aggregation function may include count, sum, and/or average. In some implementations, retrieval requests 410 may be "chained" or otherwise sequenced together to expose clustering, correlation, and causality between structured event data 162b associated with respective timestamps 164, attributes 166, 168, or any other events.

In some implementations, receiving the retrieval request 410 includes receiving a structured data retrieval offset 412. The structured data retrieval offset 412 indicates a position in a list of structured data 162b to be retrieved. Only structured data 162b after the position in the list of structured data 162b is then retrieved. For example, if the retrieval request 410 includes a structured data retrieval offset 412 of fifty (50), and the retrieval interface 400 fetches a list of one-hundred (100) elements of structured data 162b that correspond to the retrieval request 410, the retrieval interface 400 returns elements fifty (50) through one-hundred (100) instead of all of the data elements. In other implementations, the structured data retrieval offset 412 indicates a quantity of elements of the structured data 162b to return at a time. For example, the retrieval request 410 may request that the retrieval interface 400 only returns ten (10) results at a time. Optionally, the retrieval data 420 returned by the retrieval interface 400 may include a page token 422. When the retrieval interface 400 returns only a portion of the retrieval data 420 that corresponds with the retrieval request 410, the page token 422 may indicate a position in a list that corresponds with the data 420 that has been returned. That is, if the retrieval interface 400 has one-hundred (100) elements of retrieval data 420 in a list to return, and only returns ten (10) elements, the page token 422 may indicate that the next element of the retrieval data 420 that the retrieval interface 400 will return is the eleventh element. A follow-up retrieval request 410 may then include the page token 422 to indicate to the retrieval interface 400 that the requester is ready for the next "batch" or group of data 420.

Thus, the system 100 enables customers and clients to secure themselves at a high level of abstraction. That is, assets, vulnerabilities, threat and risk assessments and detections are prioritized and personalized at scale to the relevant class of business and contextualized applications (or workloads, services, etc.) that the respective customer or client has deployed. Instead of tactically securing individual resources, the system 100 secures the client's environment holistically. Specifically, the system 100 enables both automatic and assisted discovery of declared and inferred relationships for the workload and its underlying services and resources at scale. The system 100 enables both automatic and assisted understanding and baselining of the static and dynamic behavior and relationship changes normal to the specific workload (or workload class) at scale. The system 100 also enables both automatic and assisted detection of stat and dynamic anomalies at scale and the understanding of types and/or values of target data present in the context of specific applications, workloads, and workload classes. The system 100 permits either automatic or assisted targeting and findings prioritization mapped to common threat actors methods and vulnerabilities personalized for a specific client or customer, the client's specific business context, applications, workloads, and workload classes.

Figure 5:
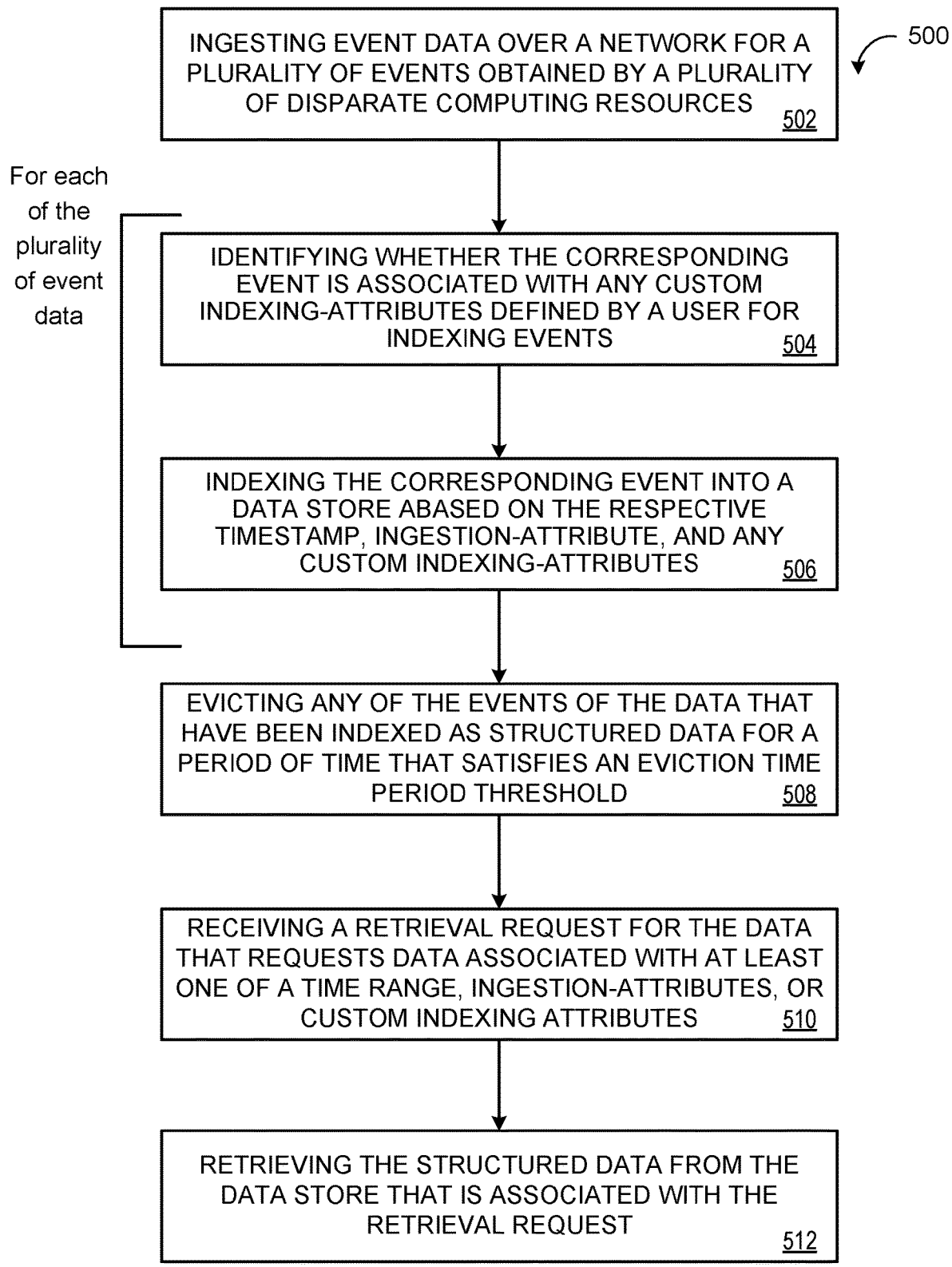
FIG. 5 is a flowchart of an example method for storing and structuring event data.

FIG. 5 is a flowchart of an example method 500 for storing and structuring event data. The flowchart starts at operation 502 by ingesting, by data processing hardware 114, event data 162 over a network 120 for a plurality of events obtained by a plurality of disparate computing resources 118 in communication with the data processing hardware 114. In some implementations, ingesting the event data is in response to at least one of: receiving an ingestion request, an indication from a time schedule, or an indication from an event. The event data 162 includes a respective timestamp 164 for each event of the event data 162 that indicates a point in time when the event was obtained by one of the plurality of disparate computing resources 118. The event data 162 also includes at least one ingestion-attribute 166 associated with each event of the event data 162. The at least one ingestion-attribute 166 satisfies ingestion criteria 210 required to permit ingesting of the associated event. In some implementations, ingesting the event data 162 includes fetching the event data 162 over the network 120 from the plurality of disparate computing resources 118 via an application programming interface.

For each of the plurality of events of the event data 162, the method 500, at step 504, includes identifying, by the data processing hardware 114, whether the corresponding event is associated with any custom indexing-attributes 168 defined by a user for indexing events. In some examples, the custom indexing-attributes 168 are defined by the user for indexing events that each include a respective key-value pair defined by a customer of the plurality of disparate computing resources 118. At step 506, the method 500 also includes for each of the plurality of events of the event data 162, indexing, by the data processing hardware 114, the corresponding event into a data store 150 as structured data 162b based on the respective timestamp 164 for the corresponding event, the at least one ingestion-attribute 166 associated with the corresponding event, and any identified custom indexing-attributes 168 associated with the corresponding event. In some examples, the data store 150 includes a distributed storage system. In other examples, the data store 150 includes a relational database.

At step 508, the method 500 includes evicting, by the data processing hardware 114, any of the events of the event data 162 that have been indexed into the data store 150 as structured data 162b for a period of time that satisfies an eviction time period threshold 322. The method 500, at step 510, includes receiving, at the data processing hardware 114, a retrieval request 410 for structured data 162b stored in the data store 150, the retrieval request 410 requesting structured data 162b associated with at least one of a time range 165 specified by the retrieval request 410, one or more ingestion-attributes 166 specified by the retrieval request 410, or one or more custom indexing-attributes 168 specified by the retrieval request 410. The retrieval request 410 requesting structured data 162b may be associated with a first time range and a second time range. The second time range is different from the first time range.

At step 512, the method 500 includes retrieving, by the data processing hardware 114, the structured data 162b from the data store 150 that is associated with the at least one of the time range 165 specified by the retrieval request 410, the one or more ingestion-attributes 166 specified by the retrieval request 410, or the one or more custom indexing-attributes 168 specified by the retrieval request 410. For instance, the structured data 162b may be associated with the time range 165 specified by the retrieval request 410 when the structured data 162b includes a corresponding timestamp 164 that falls within the specified time range 165. In some implementations, receiving the retrieval request 410 includes receiving a structured data retrieval offset 412, the structured data retrieval offset 412 indicating a position in a list of structured data 162b to be retrieved, and wherein only structured data 162b after the position in the list of structured data 162b is retrieved. Retrieving the structured data 162b may include verifying permissions of the structured data associated with the retrieval request 410.

Optionally, the method 500 includes for each of the plurality of events of the event data 162, applying, by the data processing hardware 114, a set of validity rules 210 to determine whether the corresponding event is valid. The method 500 may also include, when the corresponding event is valid based on the applied set of validity rules 210, indexing the corresponding event into the data store 150 as structured data 162b. The set of validity rules 210 may include a set of priority rules to determine a priority of the corresponding event. When the corresponding event is invalid based on the applied set of validity rules, the method 500 may include rejecting, by the data processing hardware 114, the corresponding event for indexing into the data store 150. In some examples, the method 500 includes sending, by the data processing hardware 114, a portion of the retrieved structured data 162b and a page token 422. The page token 422 indicates a position in a list of the retrieved structured data 162b and the portion of the retrieved structured data 162b includes only data 162b from earlier positions than the page token 422 in the list. At least one of the plurality of events of the event data 162 may be indicative of a measured characteristic of a corresponding one of the plurality of disparate computing resources 118. Optionally, the method 500 includes determining a priority of the measured characteristic based on a set of priority rules.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 6:
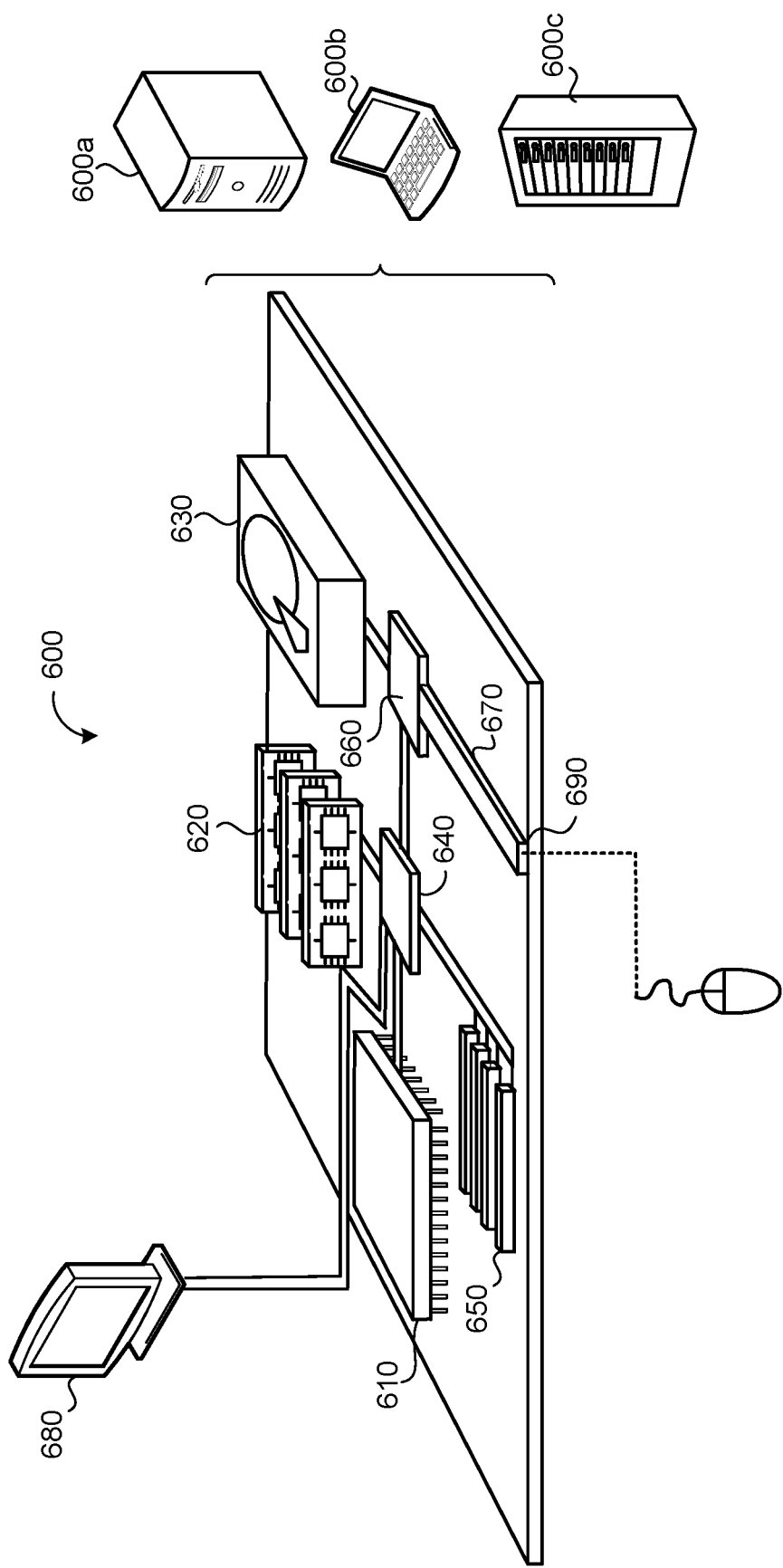
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A computer-implemented method executed on data processing hardware that causes the data processing hardware to perform operations comprising:
    receiving an event over a network obtained by a plurality of disparate computing resources in communication with the data processing hardware, the event comprising a corresponding ingestion-attribute associated with the event;

determining that the corresponding ingestion-attribute associated with the event satisfies ingestion criteria; and in response to determining that the corresponding ingestion-attribute associated with the event satisfies the ingestion criteria:

ingesting the event obtained by the one of the plurality of disparate computing resources for persistent storage in a data store by indexing, using the corresponding ingestion-attribute as an indexing-attribute, the event as structured data at the data store, the data store associated with an eviction time period threshold representing a maximum amount of time that an event may be stored at the data store and at least one attribute for determining whether the eviction time period threshold applies to a particular event stored in the data store based on a corresponding ingestion-attribute associated with the particular event;

determining, based on the corresponding ingestion-attribute matching the at least one attribute, that the eviction time period threshold applies to the event; and based on determining that the eviction time period threshold applies to the event, applying the eviction time period threshold to the event by:

determining that the event has been stored in the data store for a period of time that satisfies the eviction time period threshold; and in response to determining that the event has been stored in the data store for the period of time that satisfies the eviction time period threshold, evicting the event from the data store.

2. The computer-implemented method of claim 1, wherein ingesting the event is in response to at least one of:
receiving an ingestion request;
an indication from a time schedule; or
an indication from an event.

3. The computer-implemented method of claim 1, wherein the operations further comprise, identifying whether the event is associated with any custom indexing-attributes defined by a user for indexing events.

4. The computer-implemented method of claim 1, wherein the operations further comprise:
applying a set of validity rules to the event;
determining whether the event is valid based on the set of validity rules; and
when the event is valid, indexing the event into the data store as structured data.

5. The computer-implemented method of claim 4, wherein the set of validity rules comprises a set of priority rules to determine a priority of the event.

6. The computer-implemented method of claim 4, wherein the operations further comprise, when the event is invalid, rejecting the event for indexing into the data store.

7. The computer-implemented method of claim 1, wherein the operations further comprise:
receiving a retrieval request for data stored in the data store,
wherein receiving the retrieval request comprises receiving a data retrieval offset, the data retrieval offset indicating a position in a list of data to be retrieved, and wherein only data after the position in the list of data is retrieved.

8. The computer-implemented method of claim 1, wherein the data store comprises a distributed storage system.

9. The computer-implemented method of claim 1, wherein ingesting the event comprises obtaining the event by the one of the plurality of disparate computing resources via an application programming interface.

10. The computer-implemented method of claim 1, wherein the event is indicative of a measured characteristic of a corresponding one of the plurality of disparate computing resources.

11. A system comprising:
data processing hardware; and
memory hardware in communication with the data processing hardware, the memory hardware storing instructions that, when executed on the data processing hardware, cause the data processing hardware to perform operations comprising:

receiving an event over a network obtained by a plurality of disparate computing resources in communication with the data processing hardware, the event comprising a corresponding ingestion-attribute associated with the event;

determining that the corresponding ingestion-attribute associated with the event satisfies ingestion criteria; and in response to determining that the corresponding ingestion-attribute associated with the event satisfies the ingestion criteria:

ingesting the event obtained by the one of the plurality of disparate computing resources for persistent storage in a data store by indexing, using the corresponding ingestion-attribute as an indexing-attribute, the event as structured data at the data store, the data store associated with an eviction time period threshold representing a maximum amount of time that an event may be stored at the data store and at least one attribute for determining whether the eviction time period threshold applies to a particular event stored in the data store based on a corresponding ingestion-attribute associated with the particular event;

determining, based on the corresponding ingestion-attribute matching the at least one attribute, that the eviction time period threshold applies to the event; and based on determining that the eviction time period threshold applies to the event, applying the eviction time period threshold to the event by:

determining that the event has been stored in the data store for a period of time that satisfies the eviction time period threshold; and in response to determining that the event has been stored in the data store for the period of time that satisfies the eviction time period threshold, evicting the event from the data store.

12. The system of claim 11, wherein ingesting the event is in response to at least one of:
receiving an ingestion request;
an indication from a time schedule; or
an indication from an event.

13. The system of claim 11, wherein the operations further comprise, identifying whether the event is associated with any custom indexing-attributes defined by a user for indexing events.

14. The system of claim 11, wherein the operations further comprise:

applying a set of validity rules to the event;
determining whether the event is valid based on the set of validity rules; and
when the event is valid, indexing the event into the data store as structured data.

15. The system of claim 14, wherein the set of validity rules comprises a set of priority rules to determine a priority of the event.

16. The system of claim 14, wherein the operations further comprise, when the event is invalid, rejecting the event for indexing into the data store.

17. The system of claim 11, wherein the operations further comprise:
receiving a retrieval request for data stored in the data store,
wherein receiving the retrieval request comprises receiving a data retrieval offset, the data retrieval offset indicating a position in a list of data to be retrieved, and wherein only data after the position in the list of data is retrieved.

18. The system of claim 11, wherein the data store comprises a distributed storage system.

19. The system of claim 11, wherein ingesting the event comprises obtaining the event by the one of the plurality of disparate computing resources via an application programming interface.

20. The system of claim 11, wherein the event is indicative of a measured characteristic of a corresponding one of the plurality of disparate computing resources.

* * * * *